United States Patent
Luo et al.

(10) Patent No.: US 10,391,587 B2
(45) Date of Patent: Aug. 27, 2019

(54) LASER THERMAL COMBINATION REMANUFACTURING METHOD FOR DAMAGED METAL PART

(71) Applicant: JIANGSU UNIVERSITY, Jiangsu (CN)

(72) Inventors: Kaiyu Luo, Jiangsu (CN); Xiang Jing, Jiangsu (CN); Jinzhong Lu, Jiangsu (CN); Bo Liu, Jiangsu (CN)

(73) Assignee: JIANGSU UNIVERSITY (CN)

( * ) Notice: Subject to any disclaimer, the term of this patent is extended or adjusted under 35 U.S.C. 154(b) by 234 days.

(21) Appl. No.: 15/307,784

(22) PCT Filed: Dec. 17, 2014

(86) PCT No.: PCT/CN2014/094057
§ 371 (c)(1),
(2) Date: Oct. 28, 2016

(87) PCT Pub. No.: WO2016/074314
PCT Pub. Date: May 19, 2016

(65) Prior Publication Data
US 2017/0239751 A1    Aug. 24, 2017

(30) Foreign Application Priority Data
Nov. 12, 2014 (CN) .......................... 2014 1 0631969

(51) Int. Cl.
*B23K 26/342* (2014.01)
*B23K 26/356* (2014.01)
(Continued)

(52) U.S. Cl.
CPC ........ *B23K 26/342* (2015.10); *B23K 26/0093* (2013.01); *B23K 26/0622* (2015.10);
(Continued)

(58) Field of Classification Search
CPC .............. B23K 26/342; B23K 26/0622; B23K 26/144; B23K 26/356; B23K 26/0093;
(Continued)

(56) References Cited

U.S. PATENT DOCUMENTS 3,952,180 A * 4/1976 Gnanamuthu ......... B23K 26/34
219/121.65
5,584,662 A    12/1996 Mannava et al. ......... 416/241 R
(Continued)

FOREIGN PATENT DOCUMENTS

CN    100999046    7/2007    ................ B23P 6/00
CN    101403114    4/2009    ............. C23C 24/10
(Continued)

OTHER PUBLICATIONS

International Search Report (w/translation) and Written Opinion (no translation) issued in application No. PCT/CN2014/094057, dated Jul. 1, 2015 (9 pgs).

*Primary Examiner* — Jimmy Chou
(74) *Attorney, Agent, or Firm* — Hayes Soloway P.C.

(57) ABSTRACT

A remanufacturing method for a metal part having a damage. The damage groove is divided into a number of levels, and the groove bottom is treated by absorption layer-free laser shock peening to remove surface impurities and to refine surface-layer crystal grains. Then a cladding layer is formed by laser cladding. The process is repeated until the groove is completely filled by the cladding layer to higher than the surface of the metal part and the cladding layer higher than the surface is cut by a mechanical processing and polished, and the upper surface of the laser cladding layer is subjected to large-area overlapped laser shock peening.

20 Claims, 4 Drawing Sheets

(51) Int. Cl.
*C21D 10/00* (2006.01)
*C23F 17/00* (2006.01)
*B23K 26/0622* (2014.01)
*B23K 26/144* (2014.01)
*B23K 26/00* (2014.01)
*B23K 26/06* (2014.01)
*B23K 26/073* (2006.01)
*C23C 24/10* (2006.01)
*B23K 26/08* (2014.01)
*B23K 26/34* (2014.01)
*B23K 103/04* (2006.01)

(52) U.S. Cl.
CPC ........ *B23K 26/0626* (2013.01); *B23K 26/073* (2013.01); *B23K 26/0869* (2013.01); *B23K 26/144* (2015.10); *B23K 26/34* (2013.01); *B23K 26/356* (2015.10); *C21D 10/00* (2013.01); *C21D 10/005* (2013.01); *C23C 24/106* (2013.01); *C23F 17/00* (2013.01); *B23K 2103/05* (2018.08)

(58) Field of Classification Search
CPC ............ B23K 26/0626; B23K 26/0869; B23K 26/34; B23K 2103/05; C21D 10/00; C21D 10/005
USPC .................. 219/73, 76.1, 121.63, 121.64
See application file for complete search history.

(56) References Cited

U.S. PATENT DOCUMENTS

| | | | | |
|---|---|---|---|---|
| 5,735,044 A * | 4/1998 | Ferrigno | ................. | B23P 6/007 29/889.1 |
| 5,846,057 A * | 12/1998 | Ferrigno | ................. | B23P 6/007 416/241 R |
| 6,163,012 A * | 12/2000 | Kimura | ................ | B23K 26/106 219/121.78 |
| 6,410,884 B1 * | 6/2002 | Hackel | ................... | B21D 11/20 219/121.85 |
| 6,423,935 B1 * | 7/2002 | Hackel | ................... | G06K 1/126 219/121.85 |
| 6,670,578 B2 * | 12/2003 | Hackel | ................... | B21D 11/20 219/121.85 |
| 6,747,240 B2 * | 6/2004 | Tenaglia | .............. | B23K 26/009 219/121.6 |
| 6,881,925 B1 * | 4/2005 | Sato | ..................... | B23K 26/356 219/121.73 |
| 6,960,395 B2 * | 11/2005 | Spitsberg | .............. | C04B 35/486 416/241 B |
| 7,776,165 B1 * | 8/2010 | Dulaney | .............. | C21D 10/005 148/525 |
| 8,471,168 B2 * | 6/2013 | Ganesh | ................... | B23K 9/04 219/73 |
| 8,726,501 B2 * | 5/2014 | Schoonover | .......... | B23K 26/03 29/889.1 |
| 9,150,941 B2 * | 10/2015 | Steinwandel | .......... | C21D 10/00 |
| 9,517,537 B2 * | 12/2016 | Derrien | ................. | B23P 6/002 |
| 2003/0029845 A1 * | 2/2003 | Tamura | ................ | B23K 26/123 219/121.64 |
| 2005/0067466 A1 * | 3/2005 | Boegli | ..................... | B23K 9/04 228/119 |
| 2006/0235564 A1 * | 10/2006 | Troitski | .................... | B44F 1/04 700/166 |
| 2009/0057275 A1 * | 3/2009 | Chen | ....................... | B22F 7/064 219/76.1 |
| 2009/0314758 A1 * | 12/2009 | Ganesh | ................... | B23K 9/04 219/137 R |
| 2012/0205349 A1 * | 8/2012 | Uehara | ................ | B23K 26/128 219/121.61 |
| 2012/0325790 A1 * | 12/2012 | Chida | .................. | B23K 26/123 219/121.86 |
| 2015/0224607 A1 * | 8/2015 | Bruck | .................. | B23K 26/342 219/73.21 |

FOREIGN PATENT DOCUMENTS

| | | | | |
|---|---|---|---|---|
| CN | 102828182 | 12/2012 | ............. | C23C 24/10 |
| CN | 103409758 | 11/2013 | ............. | C23F 17/00 |
| CN | 103695939 | 4/2014 | ............. | C23F 17/00 |

* cited by examiner

Select LSP parameters, including laser pulse energy, pulse width, spot diameter, and overlapping rate of the spot in horizontal and vertical directions. And then apply LSP to treat the cladding coating to obtain the affected depth of LSP on the cladding coating "a". According to the affected depth "a", the thickness of the single laser cladding coating ("b") is selected, and the number of cladding coatings "N" is calculated on the basis of the depth of the groove "h" and the thickness of the single laser cladding coating "b".

LSPwC means preprocessing the surface of the damaged groove without absorbing layer pasted on the surface of the piece, and using the flowing water as transparent confining layer. This step can remove surface impurities, refine the surface grains, and make the structure tighter. The LSPwC parameters are listed as follows: laser pulse energy 3-12 J, pulse width 5-20 ns, spot diameter 1-3 mm, overlapping rate of the spot are 30-50 % in both horizontal and vertical directions.

Preset cladding powder on the surface of the damaged groove with a thickness of "b", and then use a fiber laser to complete the first laser cladding coating, which is cladding coating 1. The parameters of the laser cladding parameters are listed as follows: laser power 400-1800 W, scanning velocity 4-9 mm/s, spot diameter 1-3 mm, overlapping rate of the spot 30-50 %, and protective gas Ar 3-5 L/min.

When the cladding coating 1 is solidified, LSPwC is used to treat the top surface. After that, preset cladding powder with a thickness of "b" on the top surface of cladding coating 1, and then use a fiber laser to complete the second laser cladding coating, which is cladding coating 2. At this stage, LSPwC can remove surface impurities, refine the surface grains, make the structure tighter, and improve the bonding force between cladding coating 2 and cladding coating 1. The parameters of LSPwC and laser cladding are identical with step (2) and step (3) respectively.

Repeat the above steps successively until the damaged groove is completely filled by the cladding coating and higher than the metallic component, then the N-th laser cladding is completed. After the above steps, mechanical processing is used to remove the cladding coating higher than the piece and the top surface of the cladding coating is grinded and polished by sandpaper to insure the surface roughness of the cladding coating is less than 0.4 μm. During the repeated steps, each laser cladding layer uses the combination process which is LSPwC first and then laser cladding. The parameters of LSPwC and laser cladding are identical with step (2) and step (3) respectively.

Finally, massive overlapping LSP is used to strengthen the surface of the polished cladding coating. The absorbing layer is aluminum foil with a thickness of 1 mm, and the confining layer is flowing water with a thickness of 1-2 mm. The overlapping rates between both adjacent spots are 30-50 % in both horizontal and vertical directions. The LSP parameters are identical with those in step (2).

FIG. 2

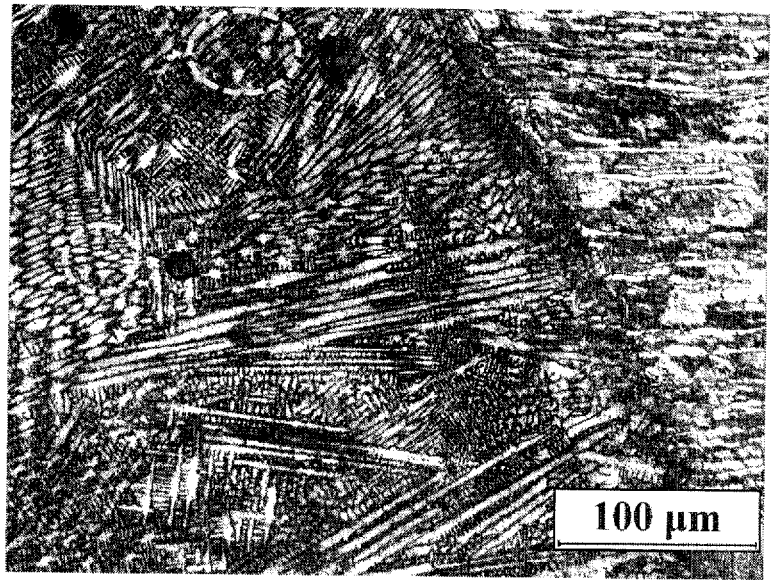
FIG. 3 – Prior Art
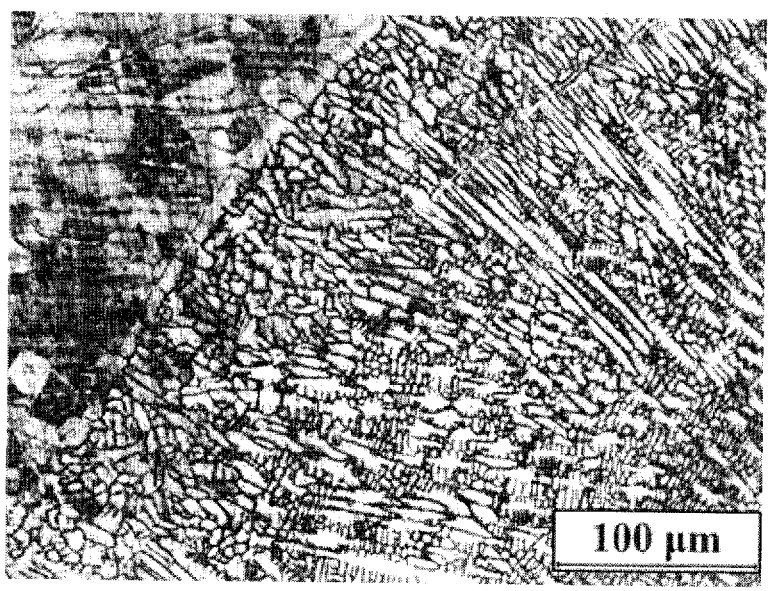
FIG. 4

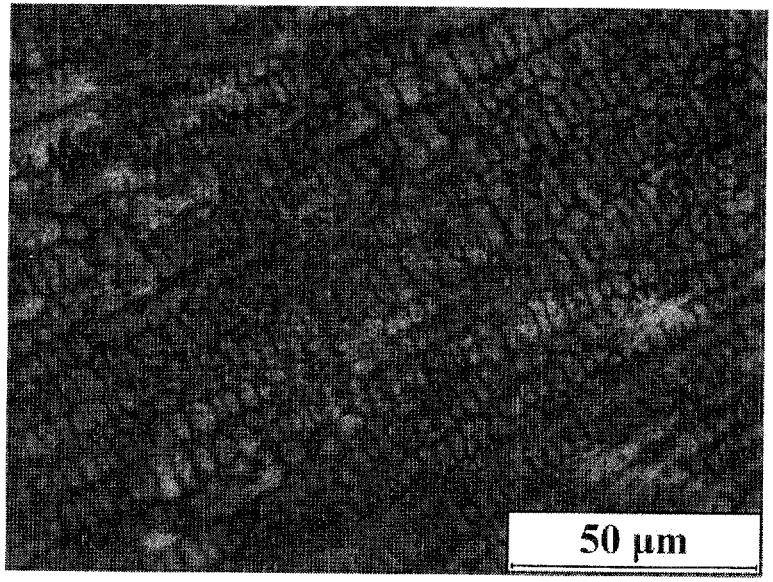
FIG. 5 – Prior Art
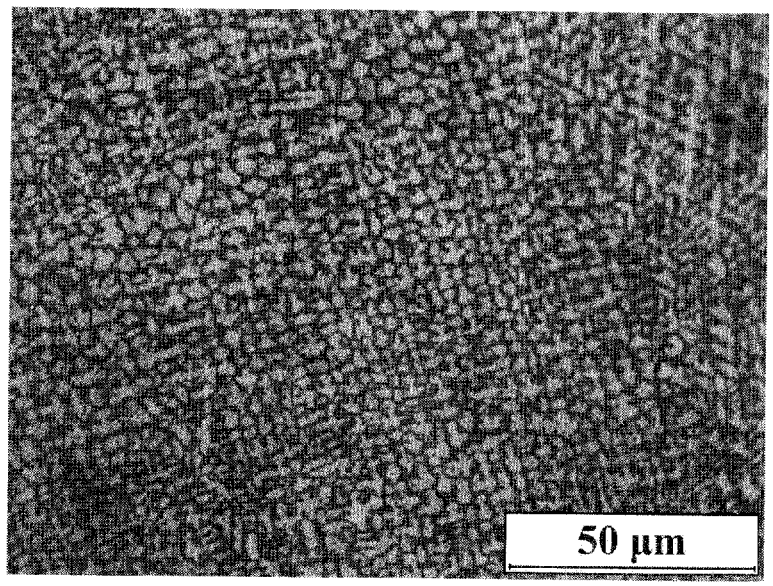
FIG. 6

LASER THERMAL COMBINATION REMANUFACTURING METHOD FOR DAMAGED METAL PART

BACKGROUND OF THE INVENTION

The present invention is related to the field of laser processing. A method of laser thermal-force remanufacturing which is used to repair damaged metallic components is especially suitable for repairing deep damaged metallic components.

Laser cladding is a new surface modification technology which is used to fuse the coating material and the surface of the substrate together by high density laser beam to produce the adding cladding layer on the surface of the substrate metallurgical bonding with substrate surface. This process has a significant improvement of wear resistant, corrosion resistant, heat resistant, oxidation resistant and electrical characteristics in the surface of the substrate. Hence, it can modify and repair the surface of the pieces, not only meet the specific performance requirements of the material surface, but also save a lot of valuable elements.

Laser shock peening (LSP), also known as laser peening, is a new method which process the components using mechanical effects of shock wave induced by intense laser. The characteristics of LSP include high-pressure, high-energy, ultra-fast and ultra-high strain rates, etc. Moreover, the shock wave induced by high energy laser pulse can refine grains and enhance the surface properties of metal components. A large number of studies have shown that LSP is an effective method to extend the time of crack initiation, reduce the rate of crack growth and improve the life of components.

When critical aviation components suffer from partial damage, other parts of the components still have good carrying capacity. Hence, extending the service life of the damaged critical components and improving its reliability have become one of core scientific issues of mechanical components remanufacturing. Laser thermal-force remanufacturing technology uses laser cladding to repair and restore the size of the damaged critical components first, and then uses LSP to refine the grains in cladding layers and improve its mechanical properties.

However, the affect depth of LSP under the top surface of metal is 1 mm or less. Hence, when the damaged depth of the metallic component is more than 1 mm, the metallic component will receive no repair out of the LSP affect depth. In laser cladding layers, defects and loose structure caused by thermal effects during laser cladding can result in poor mechanical properties and fatigue failure.

SUMMARY OF THE INVENTION

Aspects and advantages of the invention are set forth below in the following description, or may be obvious from the description, or may be through practice of the invention.

The invention has lots of advantages: combining of the thermal and mechanics effects of laser beam to remanufacture the damaged metallic components using the method in this patent, the metal in the surface layer will vapor by LSP without absorbent coating (LSPwC), thereby the impurities on the upper surface of each laser cladding layer will be removed, refining the grain at the upper surface of each laser cladding layer. Thus, the binding forces between the laser cladding layer and groove bottom surface or two adjacent laser cladding layers are increased. The microstructure of the groove will be tighter. Massive LSP treatment will also induce deep residual stress on the surface of damaged metallic components, and refine the coarse grain in the surface layer to improve the mechanical properties of the repaired metallic components.

One embodiment of the present invention is a method for repairing damaged metallic components by combining laser cladding with LSP. The method includes the grain refinement in the surface layer by LSP and then the repaired layer by laser cladding. The method further includes the process of repeating the above step until the groove of metallic components is completed filled by the cladding layer. Furthermore, some subsequent treatment processes are also included.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a flow chart of an approach of laser thermal-force remanufacturing used to repair damaged metallic components.

FIG. 3 is a cross-section OM image in the overlapped region between the substrate and the cladding layer of 316L damaged components repaired only by multi-channel laser cladding. The parameters of the laser cladding are listed as follows: the laser pulse is 1400 W, the scanning velocity is 4 mm/s, the spot diameter is 3 mm, the overlapping rate between both adjacent spots is 50%, the protective gas is Ar and its velocity is 5 L/min.

FIG. 4 is a cross-section OM image in the overlapped region between the substrate and the cladding coating of 316L damaged component, repaired by the laser thermal-force remanufacturing method, as introduced above. The parameters of the laser cladding are listed as follows: the laser pulse is 1400 W, the scanning velocity is 4 mm/s, the spot diameter is 3 mm, the overlapping rate between both adjacent spots is 50%, the protective gas is Ar and its velocity is 5 L/min. The LSP parameters are listed as follows: the laser energy is 8 J, the pulse width is 10 ns, the spot diameter is 3 mm, and the overlapping rate between both adjacent spots is 50%.

FIG. 5 is a cross-section OM image of the cladding coating of 316L damaged component repaired only by multi-channel laser cladding. The parameters of the laser cladding are listed as follows: the laser pulse is 1400 W, the scanning velocity is 4 minis, the spot diameter is 3 mm, the overlapping rate between both adjacent spots is 50%, the protective gas is Ar and its velocity is 5 L/min.

FIG. 6 is a cross-section OM image of the cladding coating of 316L damaged components repaired by the laser thermal-force remanufacturing. The parameters of the laser cladding are listed as follows: the laser pulse is 1400 W, the scanning velocity is 4 mm/s, the spot diameter is 3 mm, the overlapping rate between both adjacent spots is 50%, the protective gas is Ar and its velocity is 5 L/min. The parameters of the laser shock peening are as follows: the laser energy is 8 J, the pulse width is 10 ns, the spot diameter is 3 mm, and the overlapping rate between both adjacent spots is 50%.

DETAILED DESCRIPTION OF THE INVENTION

Figure 1:
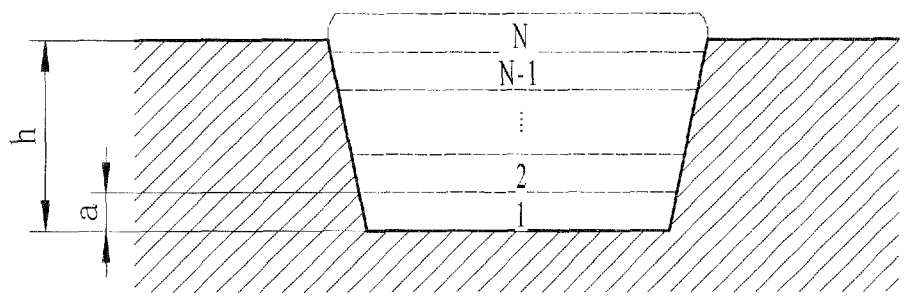
FIG. 1 is a schematic view of an approach of laser thermal-force remanufacturing used to repair damaged metallic component.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

With the above background in mind, a method of laser thermal-force remanufacturing used to repair damaged metallic components was invented, which combines LSP and laser cladding to repair the damaged component with a damaged depth more than 1 mm. In brief, the damaged groove is divided into multiple layers according to the affect depth of LSP on the cladding coating. Firstly, LSPwC is used to treat the surface layer of the groove bottom, remove surface impurities, and refine the surface grains. Secondly, laser cladding is used to form a cladding coating with a given thickness on the damaged groove. After that, each layer is treated by the above-mentioned process—LSPwC first and then laser cladding, until the groove is completely filled up by the cladding coating and higher than the metallic component. Next, the mechanical processing is used to remove the cladding coating higher than the piece and the top surface of the cladding coating is grinded and polished by sandpaper. Finally, massive overlapping LSP is applied to strengthen the surface of the cladding coating.

In the above section, LSPwC involves applying no absorbing layer between the substrate and the confining layer during LSP. In contrast, LSP is that there is an absorbing layer applied between the substrate and confining layer during LSP, which is used to absorb the laser energy and prevent the surface of the piece from the thermal effect by the laser beam.

(1) Select LSP parameters, including laser pulse energy, pulse width, spot diameter, and overlapping rate of the spot in horizontal and vertical directions. And then apply LSP to treat the cladding coating to obtain the affected depth of LSP on the cladding coating "a". According to the affected depth "a", the thickness of the single laser cladding coating ("b") is selected, and the number of cladding coatings "N" is calculated on the basis of the depth of the groove "h" and the thickness of the single laser cladding coating "b".

In this step, LSP can effectively improve the mechanical properties of cladding coating, hence, the affected depth of LSP is the depth of the mechanical properties' improvement in the cladding coating. The affected depth ("a") of LSP on the cladding coating can be obtained by detecting the depth of micro-hardness improvement along depth direction. The thickness of the single laser cladding coating ("b") is set as 2a/3, with a range from 0.3 mm to 0.8 mm. The number of cladding coatings "N" is obtained by the formula $$\frac{h}{b} < N \le \frac{h}{b} + 1,$$

in which the "N" is an integer, the "b" is the thickness of the single laser cladding coating, and the "h" is the depth of the groove. The LSP parameters are listed as follows: the laser pulse energy is 3-12 J, the pulse width is 5-20 ns, the spot diameter is 1-3 mm, the overlapping rates between both adjacent spots are 30-50% in both horizontal and vertical directions. The parameters of laser cladding are listed: the laser power is 400-1800 W, the scanning velocity is 4-9 mm/s, the spot diameter is 1-3 mm, the overlapping rate of the spot is 30-50%, and the flow of protective gas (Ar) is 3-5 L/min.

(2) LSPwC means preprocessing the surface of the damaged groove without absorbing layer pasted on the surface of the piece, and using the flowing water as transparent confining layer. This step can remove surface impurities, refine the surface grains, and make the structure tighter. The LSPwC parameters are listed as follows: laser pulse energy 3-12 J, pulse width 5-20 ns, spot diameter 1-3 mm, overlapping rate of the spot are 30-50% in both horizontal and vertical directions.

(3) Preset cladding powder on the surface of the damaged groove with a thickness of "b", and then use a fiber laser to complete the first laser cladding coating, which is cladding coating 1. The parameters of the laser cladding parameters are listed as follows: laser power 400-1800 W, scanning velocity 4-9 mm/s, spot diameter 1-3 mm, overlapping rate of the spot 30-50%, and protective gas Ar 3-5 L/min.

(4) When the cladding coating 1 is solidified, LSPwC is used to treat the top surface. After that, preset cladding powder with a thickness of "b" on the top surface of cladding coating 1, and then use a fiber laser to complete the second laser cladding coating, which is cladding coating 2. At this stage, LSPwC can remove surface impurities, refine the surface grains, make the structure tighter, and improve the bonding force between cladding coating 2 and cladding coating 1. The parameters of LSPwC and laser cladding are identical with step (2) and step (3) respectively.

(5) Repeat the above steps successively until the damaged groove is completely filled by the cladding coating and higher than the metallic component, then the N-th laser cladding is completed. After the above steps, mechanical processing is used to remove the cladding coating higher than the piece and the top surface of the cladding coating is grinded and polished by sandpaper to insure the surface roughness of the cladding coating is less than 0.4 μm. During the repeated steps, each laser cladding layer uses the combination process which is LSPwC first and then laser cladding. The parameters of LSPwC and laser cladding are identical with step (2) and step (3) respectively.

(6) Finally, massive overlapping LSP is used to strengthen the surface of the polished cladding coating. The absorbing layer is aluminum foil with a thickness of 1 mm, and the confining layer is flowing water with a thickness of 1-2 mm. The overlapping rates between both adjacent spots are 30-50% in both horizontal and vertical directions. The LSP parameters are identical with those in step (2).

In the embodiment, the Fe 304 stainless steel powder is selected as cladding material, and the substrate material is 316L stainless steel. The geometric dimensions of the substrate is 120 mm×60 mm×15 mm. In the middle of the substrate, wire cutting is used to preset an inverted trapezoidal groove, its geometric dimensions are listed as follows: the upper width is 10 mm, the bottom width is 8 mm, and the depth is 3 mm.

According to the rules above, the affected depth of LSP on the cladding coating "a" is 0.6 mm, hence, the thickness of the single laser cladding coating "b" is 0.4 mm. The depth of the groove is 3 mm, hence, according to the formula introduced in the brief description of the invention, the number of cladding coatings "N" is 8.

LSPwC is used to preprocess the top surface of the damaged groove, in which there is no absorbent material applied on the surface of the piece, and flowing water is used as transparent confining layer. This step can remove surface impurities, refine surface coarse grain, and make the structure tighter. The LSPwC parameters are listed as follows: laser pulse energy is 8 J, pulse width is 10 ns, spot diameter is 3 mm, and the overlapping rates between both adjacent spots are 50% in both horizontal and vertical directions.

Preset Fe 304 powder on the surface of the damages groove with a thickness of 0.4 mm, and then a fiber laser is used to complete the first laser cladding coating, which is cladding coating 1. The parameters of laser cladding are listed as follows: the laser power is 1400 W, the scanning velocity is 4 mm/s, the spot diameter is 3 mm, the overlapping rates between both adjacent spots are 50% in both horizontal and vertical directions, and the flow of protective gas (Ar) is 5 L/min.

When the cladding coating 1 is solidified, LSPwC is used to treat the top surface. After that, preset Fe 304 powder with a thickness of 0.4 mm on the top surface of cladding coating 1, and then use a fiber laser to accomplish the second laser cladding coating, which is cladding coating 2. At this stage, LSPwC can remove surface impurities, refine the surface grains, make the structure tighter, and improve the bonding force between cladding coating 2 and cladding coating 1. The LSPwC parameters are listed as follows: the laser pulse energy is 8 J, the pulse width is 10 ns, the spot diameter is 3 mm, and the overlapping rates between both adjacent spots are 50% in both horizontal and vertical directions. The laser cladding parameters are listed as follows: the laser power is 1400 W, the scanning velocity is 4 mm/s, the spot diameter is 3 mm, the overlapping rate both adjacent channels is 50%, and the flow of protective gas (Ar) is 5 L/min.

Repeat the above steps successively until the damaged groove is completely filled by the cladding coating and is higher than the top surface of metallic component, then the N-th laser cladding is completed. After the above steps, mechanical processing is used to remove the cladding coating higher than the top surface of metallic component, and then the top surface of the cladding coating is grinded and polished by sandpaper to insure the surface roughness of the cladding coating is less than 0.4 μm. During the repeated steps, each laser cladding layer uses the combination process—LSPwC first and then laser cladding. The LSPwC parameters are listed as follows: the laser pulse energy is 8 J, the pulse width is 10 ns, the spot diameter is 3 mm, and the overlapping rates between both adjacent spots are 50% in both horizontal and vertical directions. The laser cladding parameters are as follows: the laser power is 1400 W, the scanning velocity is 4 mm/s, the spot diameter is 3 mm, the overlapping rate between both adjacent spots is 50%, and the flow of protective gas (Ar) is 5 L/min.

Finally, the polished top surface is treated by massive LSP treatment. During this process, the absorbing layer is aluminum foil with a thickness of 1 mm, while the confining layer is the flowing water with a thickness of 1-2 mm. The LSP parameters are listed as follows: the laser pulse energy is 8 J, the pulse width is 10 ns, the spot diameter is 3 mm, and the overlapping rates between both adjacent spots are 50% in both horizontal and vertical directions.

After the above steps, the repaired metallic component is cut by wire cutting, of which the cross-sectional microstructure is observed. Then the cross-sectional microstructure is compared with that of general cladding coating. Here, the general cladding coating is the cladding coating of the damaged metallic component which is treated only by multiple laser cladding.

FIG. 3 presents the OM image of the cladding coating treated only by multiple laser cladding, and the microstructure at the interface between the substrate and the cladding coating is loose, and obvious defects can be found in the cross-section, as shown by the circles in the figure. Furthermore, the grains are disorderly arranged, and the gaps between both neighboring grains are large. Adversely, as shown in FIG. 4, there is a tight microstructure in the OM image of the cladding coating obtained by the method introduced in this invention, and no obvious defects can be found. Furthermore, the grains are more orderly arranged and the gaps between grains are relatively small.

FIG. 5 presents the OM image of the cladding coating treated only by multiple laser cladding, the grains in the top surface of the cladding coating are coarse and large, and has an average size of (6-8) μm×(3-4) μm, and the gaps between grains are large. However, as shown in FIG. 6, the microstructure at the top surface of the cladding coating obtained by the method introduced in this invention is composed of small equiaxed grains whose average size is about 3 μm. Furthermore, the grains are arranged tightly, and the gaps between the neighboring grains are significantly reduced.

The invention claimed is:
1. A method for repairing groove damage in a surface of a metal component, said method comprising the steps of:
dividing the groove into multiple depths;
using laser shock peening (LSP) with laser cladding (wC) LSPwC to treat a bottom surface layer of the groove, remove surface impurities, and refine surface grains in the bottom surface layer;
using laser cladding to form a cladding coating with a given thickness in the groove;
treating each layer by LSPwC first and then laser cladding, until the groove is completely filled by a cladding coating which extends over a top surface of metallic component;
mechanically processing to remove the cladding coating higher than the top surface of metallic component;
grinding and polishing the top surface of the cladding coating; and
overlapping LSP the top surface of the cladding coating, wherein after the cladding coating is solidified, LSPwC is used to treat a top surface of the cladding coating,
a preset cladding powder is applied to the top surface of cladding coating, and a fiber laser used to complete a second laser cladding coating, and
the depth is completely filled by the cladding coating to higher than the top surface of metallic component,
wherein the top surface of the cladding coating is ground and polished by sandpaper to insure a surface roughness of the cladding coating is less than 0.4 μm.
2. The method of claim 1, wherein the thickness of the laser cladding coating is smaller than the affected depth of LSP on the cladding coating, and a number of cladding coatings formed is based on a depth of the groove and the thickness of the single laser cladding coating.

3. The method of claim 1, wherein LSPwC is used to preprocess the surface layer at the scratch bottom, in which there is no absorbent material applied on the surface of the component, and flowing water is used as transparent confining layer.

4. The method of claim 1, including applying a preset cladding powder on the surface of the scratch, and using a fiber laser to complete the first laser cladding coating.

5. The method of claim 1, further comprising using overlapping LSP to treat the surface layer of the polished cladding coating.

6. The method of claim 5, wherein absorbing layer material is an aluminum foil with a thickness of 1 mm, a constraining layer is flowing water with a thickness of 1-2 mm, and the surface layer is treated using overlapping LSP at an overlapping rate between both adjacent spots of 30-50% in both horizontal and vertical directions.

7. The method according to claim 2, wherein an affected depth of LSP is sufficient to improve mechanical properties of the cladding coating.

8. The method according to claim 2, wherein a thickness of the single laser cladding coating is ⅔ a depth of the groove.

9. The method according to claim 2, wherein a number of cladding coatings "N" applied is determined by the following formula:

$$\frac{h}{b} < N \le \frac{h}{b} + 1$$

wherein "N" is an integer, "b" is a thickness of the laser cladding coating, and "h" is a depth of the groove.

10. The method according to claim 2, wherein the laser used has a pulse energy of 3-12 J, a pulse width of 5-20 ns, a spot diameter of 1-3 mm, and the surface layer is treated using overlapping LSP at an overlapping rate between adjacent spots of 30-50% in both horizontal and vertical directions.

11. The method according to claim 2, wherein the laser used has a power of 400-1800 W, a scanning velocity of 4-9 mm/s, a spot diameter of 1-3 mm, the surface layer is treated using LSP at an overlapping rate of 30-50%, and a flow of protective gas of 3-5 L/min.

12. The method according to claim 2, wherein the mechanical processing produces a surface roughness of the cladding coating of less than 0.4 μm.

13. A method for repairing groove damage in a surface of a metal component, said method comprising the steps of:
dividing the groove into multiple depths;
using laser shock peening (LSP) with laser cladding (wC) LSPwC to treat a bottom surface layer of the groove, remove surface impurities, and refine surface grains in the bottom surface layer;
using laser cladding to form a cladding coating with a given thickness in the groove;
treating each layer by LSPwC first and then laser cladding, until the groove is completely filled by a cladding coating which extends over a top surface of metallic component;
mechanically processing to remove the cladding coating higher than the top surface of metallic component;
grinding and polishing the top surface of the cladding coating; and
overlapping LSP the top surface of the cladding coating, wherein the thickness of the laser cladding coating is smaller than the affected depth of LSP on the cladding coating, and a number of cladding coatings formed is based on a depth of the groove and the thickness of the single laser cladding coating,
wherein a number of cladding coatings "N" applied is determined by the following formula:

$$\frac{h}{b} < N \le \frac{h}{b} + 1$$

wherein "N" is an integer, "b" is a thickness of the laser cladding coating, and "h" is a depth of the groove.

14. The method of claim 13, wherein LSPwC is used to preprocess the surface layer at the depth bottom, in which there is no absorbent material applied on the surface of the component, and flowing water is used as transparent confining layer.

15. The method of claim 13, including applying a preset cladding powder on the surface of the depth, and using a fiber laser to complete the first laser cladding coating.

16. The method according to claim 13, wherein an affected depth of LSP is sufficient to improve mechanical properties of the cladding coating.

17. The method according to claim 13, wherein a thickness of the single laser cladding coating is ⅔ a depth of the groove.

18. The method according to claim 13, wherein the laser used has a pulse energy of 3-12 J, a pulse width of 5-20 ns, a spot diameter of 1-3 mm, and the surface layer is treated using overlapping LSP at an overlapping rate between adjacent spots of 30-50% in both horizontal and vertical directions.

19. The method according to claim 13, wherein the laser used has a power of 400-1800 W, a scanning velocity of 4-9 mm/s, a spot diameter of 1-3 mm, the surface layer is treated using LSP at an overlapping rate of 30-50%, and a flow of protective gas of 3-5 L/min.

20. The method according to claim 13, wherein the mechanical processing produces a surface roughness of the cladding coating of less than 0.4 μm.

* * * * *